United States Patent [19]

Siems et al.

[11] 4,092,629
[45] May 30, 1978

[54] DECENTRALIZED SEISMIC DATA PROCESSING SYSTEM

[75] Inventors: Lee E. Siems; Paul M. Morgan; Carl H. Savit, all of Houston, Tex.

[73] Assignee: Western Geophysical Co. of America, Houston, Tex.

[21] Appl. No.: 664,618

[22] Filed: Mar. 8, 1976

[51] Int. Cl.² .............................................. G01V 1/22
[52] U.S. Cl. ........................ 340/15.5 TS; 179/15 AL; 179/15 BL; 340/7 R; 340/15.5 DP; 340/15.5 MC; 340/152 T; 340/183
[58] Field of Search ................ 340/15.5 TS, 15.5 DP, 340/15.5 MC, 151, 152 T, 183, 7 R; 179/15 A, 15 BL, 15 AL

[56] References Cited

U.S. PATENT DOCUMENTS

| | | | |
|---|---|---|---|
| 3,831,136 | 8/1974 | Sagoci | 340/7 R |
| 3,851,302 | 11/1974 | Schmitt | 340/15.5 TS |
| 3,873,961 | 3/1975 | Lee et al. | 340/15.5 TS |
| 3,881,166 | 4/1975 | Fort et al. | 340/15.5 TS |
| 3,911,226 | 10/1975 | Angelle et al. | 340/15.5 TS |
| 3,930,145 | 12/1975 | Fort et al. | 340/15.5 TS |
| 3,986,162 | 10/1976 | Cholez et al. | 340/15.5 TS |
| 3,990,036 | 11/1976 | Savit | 340/15.5 TS |
| 4,042,906 | 8/1977 | Ezell et al. | 340/152 T |

*Primary Examiner*—Howard A. Birmiel
*Attorney, Agent, or Firm*—William A. Knox

[57] ABSTRACT

The seismic system includes a seismic sensor cable assembly having 50 cable sections and much of the seismic data processing electronics decentralized into the cable structure itself. The cable assembly is coupled to a central station mounted in a recording vehicle. The central station includes recording circuitry and apparatus to receive, process and record digital data words from a data link in the cable assembly and circuitry for transmitting control signals into an interrogation link in the cable assembly. The electrical output of each sensor unit constitutes a separate input channel. The cable sections are spaced apart and interconnected by small-diameter, cylindrical connector modules which contain a transceiver unit for processing the signals from ten sensor units in an associated cable section. Contained within each transceiver unit is a multiplexer having a plurality of filtered input channels coupled respectively to the elemental sensor units, and an output. In response to a first interrogation pulse transmitted through the interrogation link from the central station unit, the multiplexer advances to a selected input channel to acquire a first analog data sample. A second interrogation pulse sequences the respective multiplexers in all 50 modules to select a second channel for sampling and digitizing to provide digital data-words for the respective second channels. The self clocking phase-encoded data words transmitted from the respective transceiver associated with each cable section are ordered in accordance with the propagation delay time of the interrogation link between the central station and the respective transceiver units. Self clocking data words from corresponding channels within the respective transceiver units are ordered in accordance with the channel-select sequence during a scan cycle.

15 Claims, 21 Drawing Figures

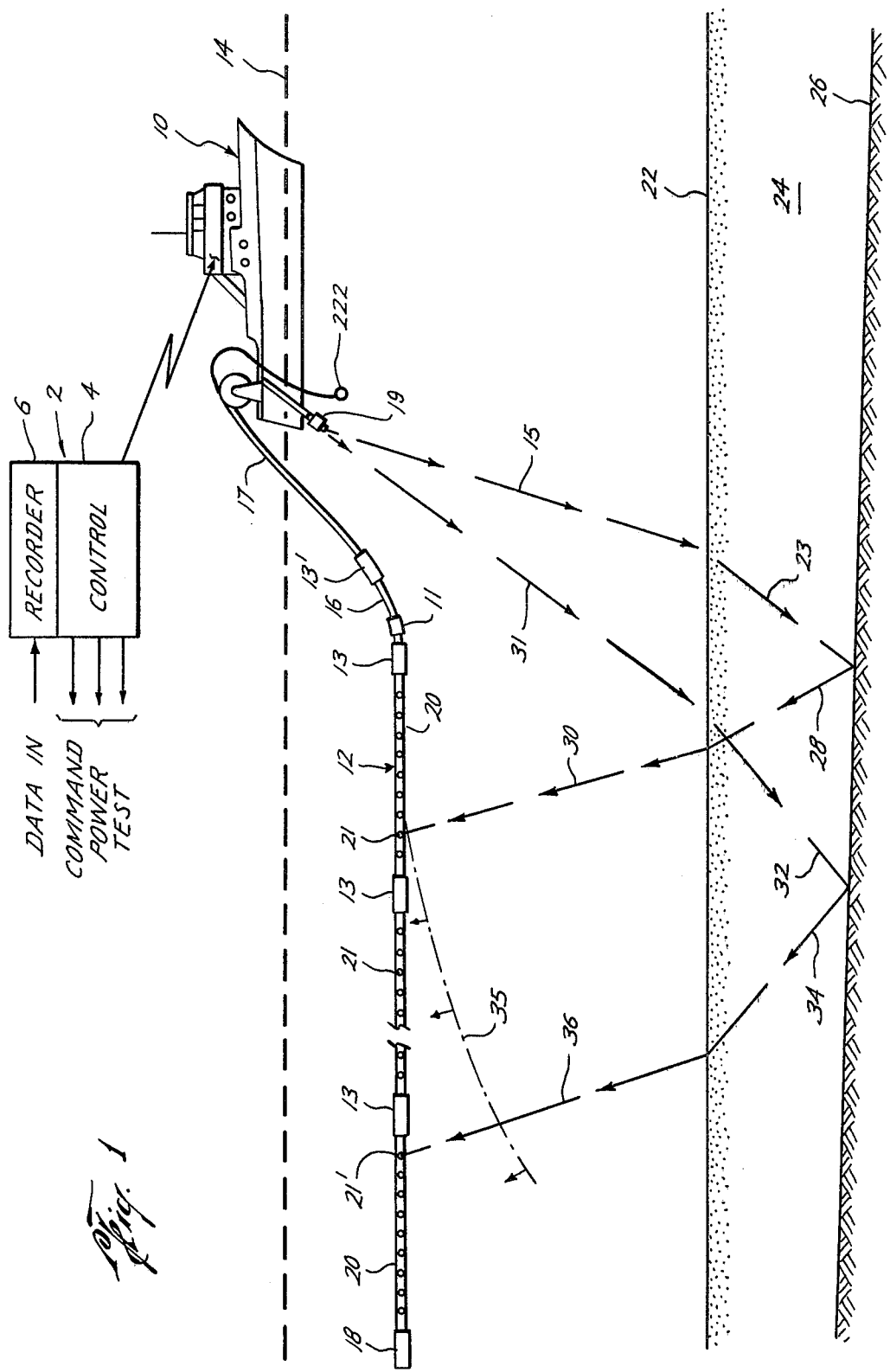

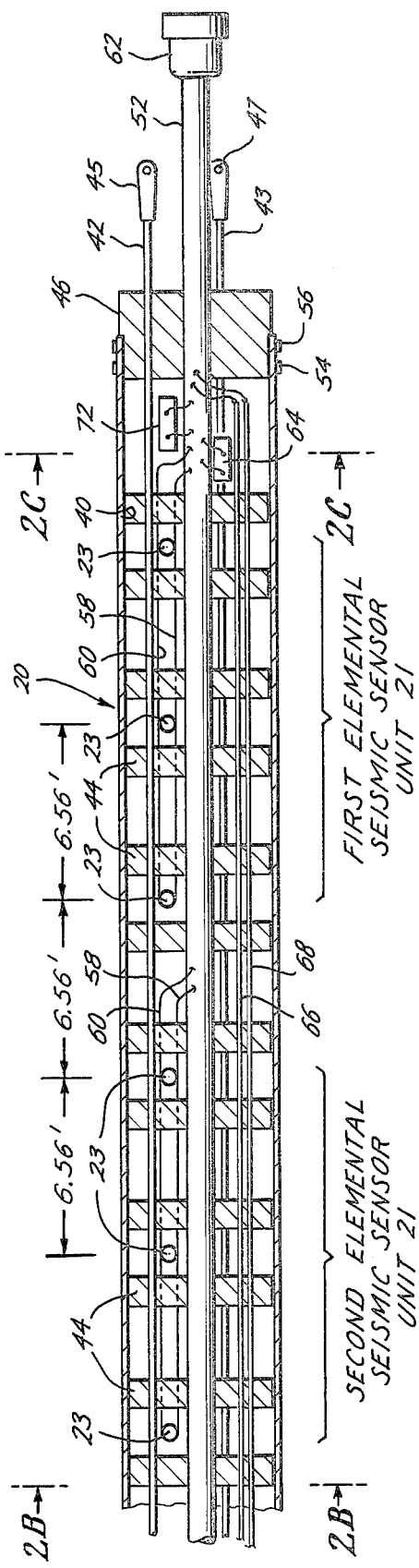
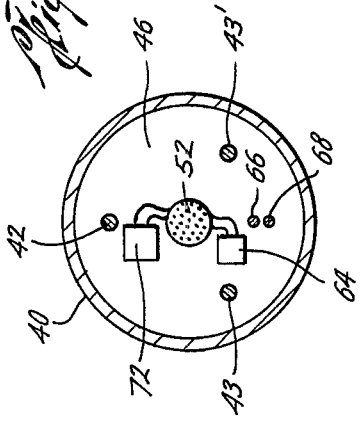
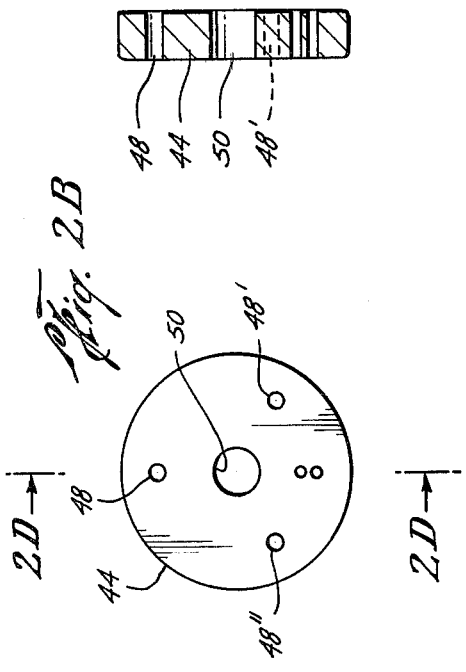

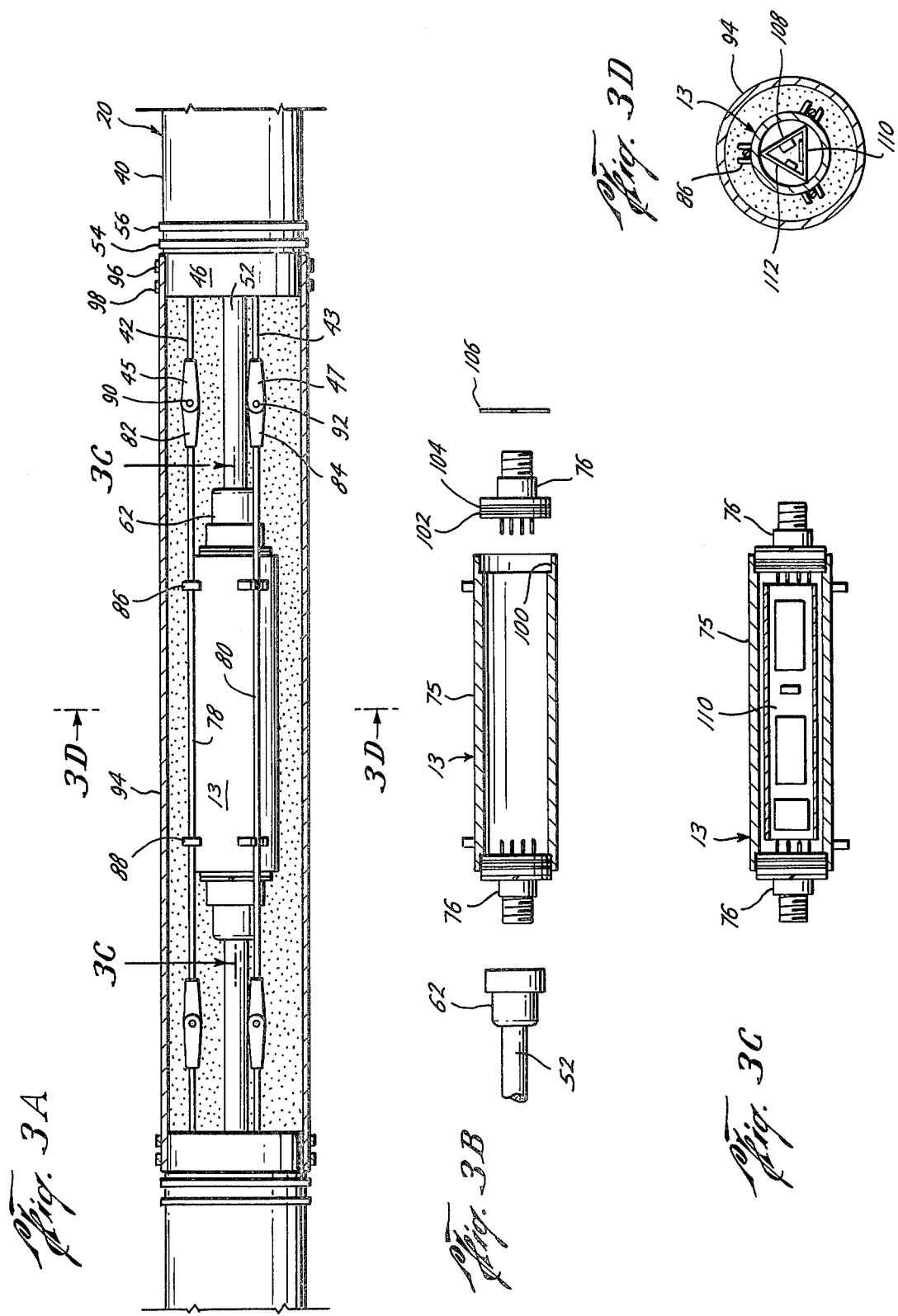

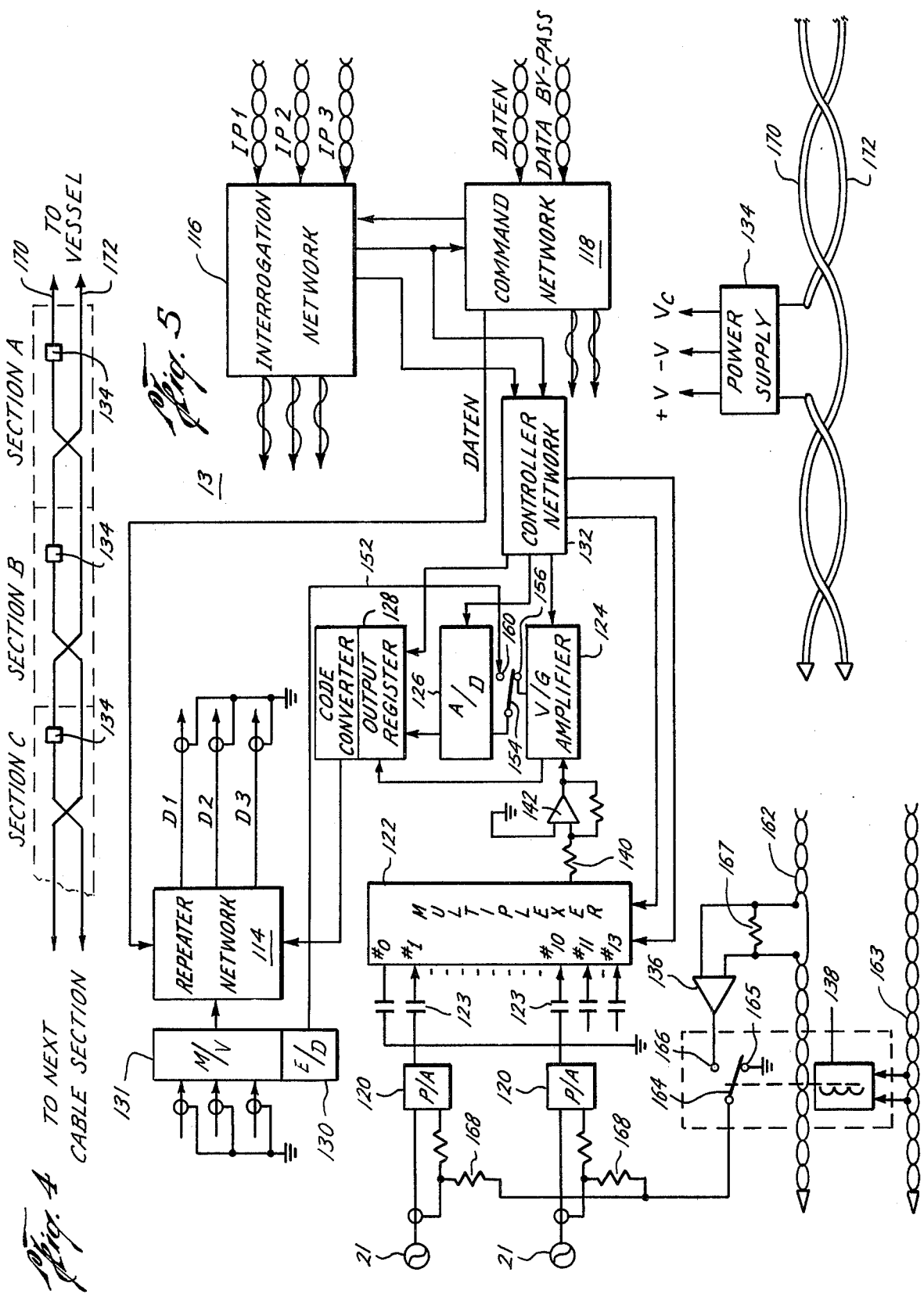

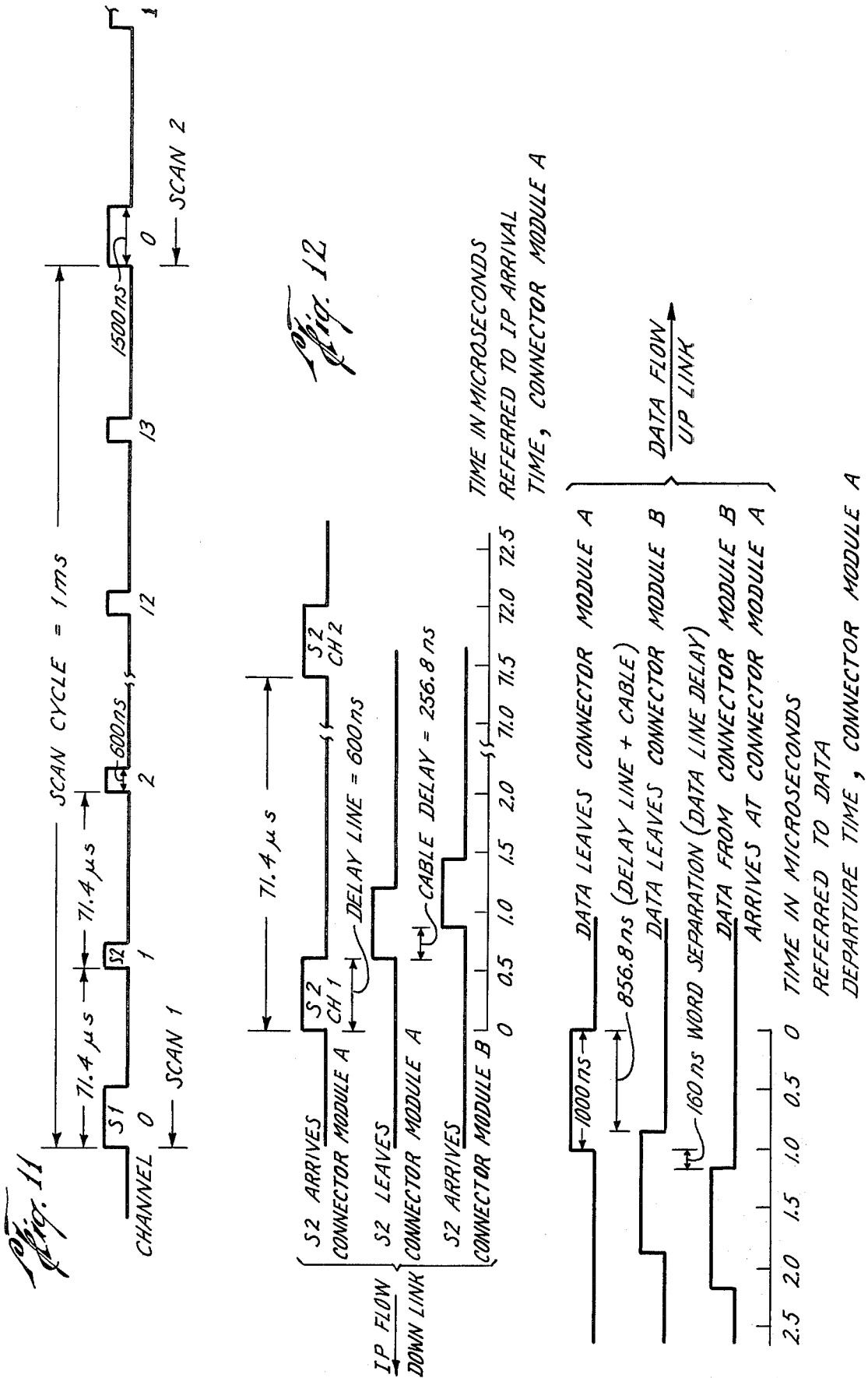

DECENTRALIZED SEISMIC DATA PROCESSING SYSTEM

CROSS-REFERENCES TO RELATED APPLICATIONS

The present case is related to the following patent applications which were filed concurrently:

1. U.S. Pat. application Ser. No. 664,614 and now U.S. Pat. No. 4,031,506, entitled "Multiplexer Commutated High Pass Filter;" inventor LEE E. SIEMS:
2. U.S. Pat. application Ser. No. 664,616 and now U.S. Pat. No. 4,031,504, entitled "Gain Ranging Amplifier," inventor George Mioduski.
3. U.S. Pat. application Ser. No. 665,151 and now U.S. Pat. No. 4,023,140 "Seismic Data Telemetry System," inventors LEE E. SIEMS, et al.
4. U.S. Pat. application Ser. No. 665,150 entitled "Seismic Method and System of Improved Resolution and Discrimination," inventor CARL H. SAVIT.
5. U.S. Pat. application Ser. No. 664,615 and now U.S. Pat. No. 4,005,273 entitled "Multiplexer Offset Removal Circuit," inventor LEE E. SIEMS.
6. U.S. Pat. application Ser. No. 664,617, entitled "Multichannel Seismic Telemetering System and Array Former," inventors LEE E. SIEMS, et al.

BACKGROUND OF THE INVENTION

In seismic exploration, an acoustic wave is generated at or near the surface of the earth. The acoustic wave travels downwardly and is reflected from subsurface earth layers, whence the wave returns to the earth's surface. The reflected seismic waves are detected by sensitive seismic sensors distributed in a substantially linear array at or near the surface of the earth.

In accordance with the usual practice up to the present time, 25 to 30 seismic sensors are equally spaced along a single cable section, 100–300 feet long. The sensors are all electrically connected together to form a single elongated data channel. Fifty or more such cable sections are coupled together to form a cable assembly 10,000 feet or more long. The output of each of the 50 or more channels is connected to a central signal processing device located at one end of the cable assembly. A separate pair of wires is connected to each channel. There may be therefore, 50 or more such pairs. Because of the expense and physical weight of such a large number of wires, schemes have been proposed wherein the output signals from each channel are time-delay multiplexed through a single data transmission channel. See for example copending U.S. Pat. applications Ser. Nos. 576,943 and 446,862, now U.S. Pat. Nos. 3,996,553 and 3,990,036.

Although this invention will be described with particular reference to geophysical surveying, it may be used to detect objects submerged beneath the water such as large fish, vessels, and the like.

Other prior art systems useful in reviewing the background of this invention are U.S. Pat. Nos. 3,851,302; 3,652,979; 3,748,638; and 3,873,961. All of these patents teach the use of telemetering systems wherein a signal processing module inside of each of a plurality of seismic cable sections digitizes the seismic data from one seismic detector or detector group. By use of various multiplexing schemes, the data are transmitted to a recording device over a telemeter channel.

As discussed earlier, a seismic sensor group is an array 100–300 feet long. An acoustic wave whose wavefront is substantially parallel to the plane along which the seismic sensors are disposed, will arrive at all of the sensors substantially simultaneously thereby enhancing the output signal by summation. Under actual seismic prospecting conditions this ideal situation rarely exsists, except for the special case in which the wavefront is reflected vertically from a reflector lying directly below the array. In the more usual case, the acoustic wavefront sweeps across the array at an angle. Because of the angularity, the wavefront impinges on one end of the array well ahead of the time that it reaches the other end of the array. The travel time of the wavefront across the array depends upon the seismic wave phase velocity, the wavelength of the acoustic wave, the array length and the depth of the reflector, among other factors. If the array length is large compared to the wavelength of the acoustic wave the array will attenuate the acoustic wave. The seismic sensor group or array must be shorter than the wavelength of the incident seismic waves to avoid attenuation and preferably, the group should be less than one-quarter of this wavelength for good response.

Traditionally, energy in the lower end of the seismic spectrum, involving wavelengths of many hundreds of feet, was of interest. Use of relatively long arrays was satisfactory. More recently, however, greater resolution of geologic layering is being demanded. Greater resolution requires use of seismic waves having higher frequencies. But the wavelengths of the energy in the upper end of the seismic spectrum are comparable to or much shorter than the length of conventional seismic sensor arrays in present use. It would be desirable, therefore, to substitute many shorter seismic sensor arrays instead of one long seismic sensor array in each cable section. Such a possibility has been considered to be impossible in view of the data processing complexities and the large number of conductors that would have been required, resulting in seismic cable assemblies of impractical size and bulk.

SUMMARY OF THE INVENTION

It is an object of this invention to increase the resolution of large scale seismic systems, without increasing the weight or bulk of the seismic cable assembly. It is a further purpose of this invention to decentralize the signal conditioning electronics normally found in a central recording vehicle, by incorporating the electronics within the individual cable sections that comprise the cable assembly. In addition, seismic signals from individual seismic sensors are digitized and transmitted to a central station over a data link by employing a two-level propagation time delay multiplexing scheme.

In accordance with an important aspect of this invention a seismic cable assembly is made up of a plurality of identical seismic cable sections each of which includes a number of, such as 10, discrete, short, elemental seismic sensor units in place of one long single array. Since each elemental sensor unit becomes a separate signal channel, the number of channels to be serviced in a complete cable assembly becomes multiplied by a factor of at least 10. Accordingly, in a preferred embodiment, the system samples and multiplexes the outputs from 500 to 1000 data channels over a single data link to a central station, within the time-span of a desired sampling interval, such as 0.5 to 1.0 millisecond.

In one embodiment of this invention, the seismic cable system comprises at least 10 substantially identical cable sections. Included in each cable section, is a number of seismic sensor units. A transceiver unit in associated respectively with each cable section. The transceiver unit includes an output circuit for transmission of digitized seismic signals from the cable, common electronic circuits for amplifying and digitizing analog input information and switching circuitry for successively connecting the seismic sensor units to the common electronic circuitry. The cable sections and transceiver units are respectively mechanically and electrically connected together. The signals from all of the transceiver units are successively applied to the output circuit of said cable and are respectively applied to the output circuit while the switching circuitry is connected to receive signals from different sensor units. In this fashion, digital signals from all of the sensor units are successively applied to the cable output circuit. The length of each seismic sensor unit is a predetermined fraction of the length of a seismic wavelet whose frequency corresponds to the successive application rate of the signals to the cable output circuit discussed below.

In accordance with another aspect of this invention a seismic cable assembly is coupled to a central station. The cable assembly consists of a number of active cable sections each containing interrogation and data links as well as a number of elemental seismic sensor units. The connector modules with the transceiver units therein connect adjacent ones of the cable sections together. Each transceiver unit has a plurality of input channels, a data repeater network and an interrogation network. The interrogation network of each transceiver unit is connected in series with the interrogation link. The elemental seismic sensor units are coupled to corresponding input channels of a transceiver unit located at one end of an associated cable section. The data repeater network of each transceiver unit is coupled to the data link.

A further feature of this invention includes a multiplexer switch in the transceiver unit. The multiplexer switch is sequenced by a control network which is connected to the interrogation network. In response to interrogation pulses from the interrogation link, the interrogation network causes the control network to sequence the multiplexer, and to digitize the analog data from the seismic sensor units and to transmit a self clocking digital word to the transmission channel through the data repeater network.

In accordance with another aspect of this invention, the filters, multiplexer, gain conditioning amplifiers, digitizer and other electronics that are normally mounted in a recording vehicle associated with a conventional seismic data acquisition system are decentralized. The data-processing electronics are removed from the central data acquisition system and are packaged in identical miniaturized connector modules, one of which is associated with each cable section. The plurality of identical cable sections are spaced apart by and connected by a like plurality of identical connector modules. Analog signals from the elemental sensor units within a cable section are fed via local data lines to the associated transceiver unit in the connector modules where they are filtered, multiplexed, sampled, gain conditioned and digitized. All that remains in the recording vehicle is a central station having a signal receiver and recorder to record digital data words received from the data transceivers through a data link and control logic to transmit control and interrogation pulses to the data transceivers through an interrogation link.

In accordance with a feature of the invention, the length of an elemental sensor unit, including three or more sensors, is less than 50 feet, and preferably less than 20 feet. A sensor unit length of 12½ feet, for example, corresponds to a half-wavelength at 200 Hz, and a quarter wavelength at 100 Hz, using a seismic wave velocity of 5,000 feet per second. High-frequency seismic events will therefore be detected by the sensor units even in the case of very shallow reflections at remote points along the cable.

Further, the one millisecond sampling rate for the seismic signal electronics has a Nyquist frequency limit of 500 cycles per second. In the course of the sampling process, frequencies greater than the Nyquist frequency produce spurious or "alias" low frequency signals which would be indistinguishable from desired signal information. In the present system, the response of the 1 millisecond anti-alias low pass filters employed to exclude the high frequencies will be at least $-60$dB (1000:1), with respect to full scale at 500 Hz. The $-6$dB point occurs at 250 Hz. Thus, the effective upper cutoff frequency is one-half the Nyquist limit. This is of course well above the seismic frequencies of interest, and the system therefore provides the desired high frequency pass band to the recorder that is desired in the present high-resolution seismic system.

In accordance with another feature of this invention, the transceiver units have constant current power supplies and alternating current power is supplied at a frequency substantially above the highest signal sampling frequency.

In accordance with another aspect of this invention, a trunk cable in each section of the cable assembly includes a data link, an interrogation link and ancillary power and control links. The trunk cable interconnects the plurality of transceiver units in series with each other with the central station in a recording vehicle.

Contained within each transceiver unit are a plurality of preamplifiers/filters, each having an input and an output. The inputs are coupled to a like plurality of elemental seismic sensor units mounted within the associated cable section. The preamplifier/filter outputs are connected to corresponding inputs of a multiplexer, the single output of which is coupled to a common gain-conditioning amplifier, digitizer, temporary storage and output register, code converter and repeater network. The output of the repeater network is, in turn, connected to the data link. The interrogation link is coupled to the multiplexer and the output register through a control network. In response to an interrogation pulse transmitted through the interrogation link to the transceivers, the multiplexer in each transceiver is sequenced by the control network to a selected channel to acquire an analog data sample. The data sample is gain conditioned, digitized as a digital data word, and is clocked to the repeater network from the output register and code converter. Thus, as the interrogation pulse arrives at each of the respective transceiver units, a corresponding self clocking phase-encoded data word is transmitted to the central station through the data link. A second interrogation pulse advances the respective multiplexers in the transceiver units to select a second channel for sampling and digitizing and to transmit a phase-encoded word for the first channels of the transceiver units. Accordingly, over a period of one scan cycle, all of the channels in all of the respective transceivers are sampled.

A feature of this invention involves the provision a two-level multiplexing system wherein phase-encoded data works transmitted from the respective transceivers associated with each cable section are ordered in accordance with the propagation delay time of the interrogation signal between the central station and the respective transceiver units. Phase-encoded words from corresponding channels within the respective transceiver units are ordered in accordance with the channel-select sequence during a scan cycle. With this arrangement therefore, analog signals from all 500 seismic sensor units will be digitized and the digital data words are transmitted from the cable during each one-millisecond sample interval. Thus, the signals from channel No. 1 of each of the 50 cable sections are transmitted in sequence followed by channel No. 2 signals from each cable section, etc.

In accordance with a further aspect of this invention, the data and interrogation links comprise three parallel, redundant lines. A majority-vote circuit in each transceiver unit accepts a signal from any two of the three lines. An error-detect circuit coupled to the data and interrogation links at each transceiver unit detects a broken line within the associated cable section when the majority vote circuit does not detect three identical inputs.

In accordance with yet another feature of this invention, the transmission link is a wide-band transmission channel having a bandwidth of at least 100 megahertz.

In accordance with another feature of this invention, each transceiver includes a data repeater which includes a signal receiver, regenerator and transmitter to receive, regenerate and retransmit signals from down-link cable sections to up-link transceivers. An artificial delay line in the interrogation network may be series-connected to the interrogation link in each transceiver to delay the arrival of the interrogation pulse at down-link transceivers and thereby to separate data words from adjacent cable sections.

Another feature of this invention embodies a calibration signal which is transmitted from the central station to drive each elemental seismic sensor unit. The output of each sensor unit is compared with the input signal to derive a sensor calibration factor.

In an illustrative embodiment of this invention, the cable assembly is a marine streamer cable including a terminator section. The streamer cable contains auxiliary sensors to detect ambient water pressure and saltwater leakage inside the streamer.

In accordance with another aspect of this invention, a means is provided to measure the stretch of the active cable assembly. A shock-absorbing, elastic section is spaced apart from and coupled to the leading end of the cable assembly by means of a strain gauge. A data transceiver is connected to the leading end of the elastic section. Output signals from the strain gauge are transmitted to an auxiliary input channel of the transceiver at the leading end of the elastic section.

As an additional feature of this invention, the trailing end of the lead-in cable is connected to the transceiver unit located at the leading end of the elastic section. The leading end of the lead-in cable is secured to a towing vehicle. The lead-in cable includes a trunk cable and a plurality of local auxiliary input channels coupled to the inputs of the transceiver unit located between the lead-in cable and the elastic section. A number of auxiliary sensors, positioned near the towing vehicle, are connected to the local auxiliary input channels.

BRIEF DESCRIPTION OF THE DRAWINGS

For a more complete understanding of the present invention and the further objects and advantages thereof, reference may now be made to the following description taken in conjunction with the drawings wherein:

FIG. 1 Is an overall view of an illustrative decentralized seismic data acquisition system deployed in the water, towed behind a vessel;

FIGS. 2a–d are cross-sectional views of a cable section;

FIGS. 3a–d are cross-sectional views of a connector module;

FIG. 4 is a diagram of the transceiver unit power-supply connections;

FIG. 5 is a schematic diagram of the transceiver unit contained in a connector module;

FIG. 11 is a timing diagram of a scan cycle;

FIG. 12 is a timing diagram showing the sequence of interrogation and data transmission with respect to two cable sections;

DETAILED DESCRIPTION OF THE INVENTION

Figure 6:
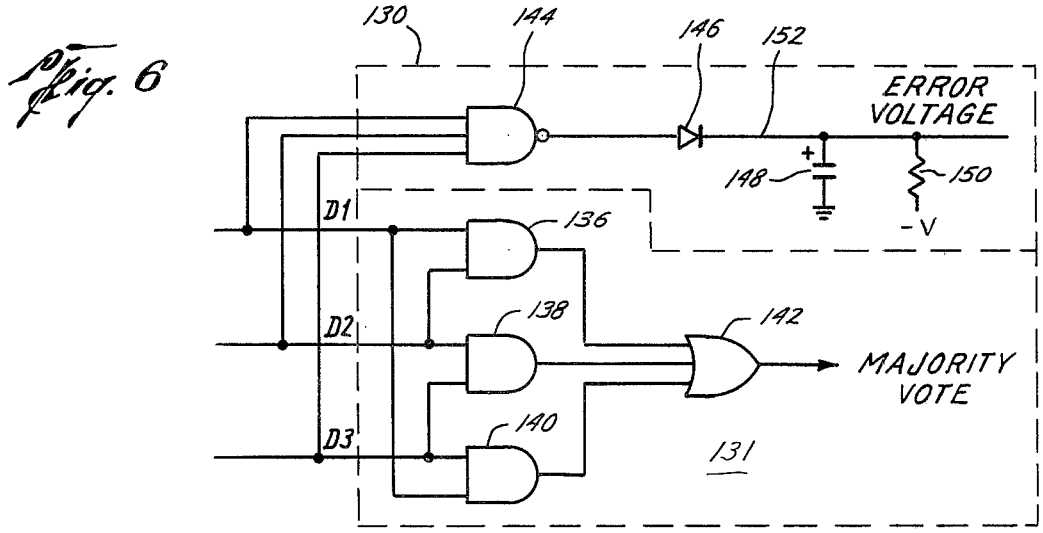
FIG. 6 is a schematic diagram of the majority-vote and error-detect circuits.

Referring to FIG. 1, a vessel 10 tows a seismic sensor cable assembly 12 through a body of water 14. Seismic sensor cable assembly 12 is connected to a shock-absorbing elastic section 16 and to a lead-in 17. The trailing end of cable assembly 12 is connected to a short terminator section 18. Cable assembly 12 is divided into individual active cable sections 20, which are typically 196.8 feet (60 meters) long. A connector module 13, contained inside a transceiver unit, connects active cable sections 20 together, electrically and mechanically. A typical seismic sensor cable assembly 12 consists of 50 or more active sections 20, and may have a total length of 10,000 feet or more. Each cable section may contain ten elemental sensor units 21, each one of which constitutes a single channel. The sensors may be hydrophones. The entire cable assembly 12 therefore produces output signals from 500 individual channels.

Signal outputs from elemental sensor units 21 are coupled to a transceiver unit which transmits the signal to a central station 2 on vessel 10. The central station includes control circuitry 4 to transmit interrogation, command, power, and test signals and an apparatus 6 to receive and record digital data words from the data link.

At intervals, as the vessel tows cable assembly 12 through the water, a seismic sound source 19, such as an air gun or a gas exploder, generates acoustic waves in the water. The acoustic waves propagate downwardly through water 14 along ray path 15, impinging upon water bottom 22, where they become refracted along path 23 due to the difference in velocity between water 14 and earth formation 24. Penetrating the earth, the acoustic waves continue along refracted ray path 23 and become reflected from a subsurface earth layer 26. The reflected acoustic waves return along ray path 28 to water bottom 22 and thence continue upwardly along ray path 30. The reflected waves are detected by a sensor unit 21 which converts the reflected acoustic waves to an electric signal. The acoustic waves also take other ray paths, such as 31 – 32 – 34 – 36, where they are detected by a sensor unit such as 21', more remote from vessel 10 than sensor unit 21. Although similar ray paths may be traced between sound source 19 and each of the 500 sensor units in seismic cable assembly 12, only two such paths have been drawn for simplicity.

FIG. 2a is a schematic longitudinal cross-sectional showing of the leading end of an active seismic cable section 20. For convenience in representation, the longitudinal dimensions have been significantly compressed. The section consists of an outer plastic skin 40, three steel stress members 42, 43 (the third stress member not shown), a plurality of bulkhead spacers 44, and a terminal bulkhead 46, one at each end of the section. Plastic skin 40 has an internal diameter of 2.75 inches with a 0.187 inch wall thickness. Spacer bulkheads 44 are placed at 2-foot intervals inside plastic skin 40 for internal support. Each bulkhead 44 has three holes 48, 48', 48'' (FIG. 2b) for the passage of the stress members and a central hole 50 for the passage of trunk cable bundle 52. The skin is fastened to terminal bulkhead 46 by steel bands 54, 56. The entire skin is filled with a light kerosene to give it neutral buoyancy in the water.

A plurality of sensors 23 such as hydrophones are mounted at 6.56 foot (2 meter) intervals inside cable section 20. Each sensor is supported between a pair of closely spaced bulkheads by flexible ties of any convenient type. Each cable section preferably contains at least thirty sensors 23. In a preferred configuration, three sensors 23 are connected in parallel by local data lines 58, 60, thereby to form an elemental seismic sensor unit 21. Since the sensors are 6.56 feet apart, the length of the elemental sensor unit is 13.12 feet (4 meters) and the separation between group centers is 19.68 feet (6 meters). Local data lines 58, 60 join cable bundle 52 and conduct the sensor-unit signals to appropriate pins of a multiconductor connecting plug 62. In this arrangement, each elemental unit of three sensors supplies signals to a single data channel. The parallel connection causes the electrical outputs of the individual sensors 23 to be algebraically summed.

Summation of the signals tends to reinforce desired, systematic reflected signals and to suppress undesired, random noise signals, provided the seismic wave front is substantially parallel to the plane of the array. In this ideal circumstance, all of the sensors 23 in elemental sensor units 21, 21' (FIG. 1) will "see" the wavefront and receive the seismic waves in phase. The angle becomes greater with increasing distance from the source. Additionally, the ray path angle will depend upon the slope of water bottom 22, reflector 26 and many other factors.

By definition, a wave-front such as 35, which may be a wavelet crest, propagates perpendicularly to the ray paths 30, 36. As wavelet crest 35 sweeps across cable assembly 12, it will be first seen by sensor 21, and some time later, by sensor unit 21'. At the instant that wavelet crest 35 impinges upon sensor unit 21, it is possible that the wavelet trough of a preceeding wavelet is still being sensed by a sensor unit 21'. If all of the sensors between 21 and 21' were connected together in one long array, signals from the sensor outputs would tend to attenuate rather than reinforce. It is desirable therefore that the length of the elemental sensor unit be short with respect to the wave length of the highest-frequency seismic signal of interest.

The wavelength of a seismic wave as seen by a group of seismic sensors electrically connected together depends in a complex way on the angle of dip and the depth of subsurface earth layers, the seismic wave velocity, the distance between the acoustic source and the sensors, and many other factors. Consideration will now be given to a group of electrically connected seismic sensors disposed at or near the surface of a body of water for example. The group has a length X. If a horizontally-travelling wavelet (angle of incidence = 90°) is incident at one end of the group, the time T required for the wavelet to traverse the group is $$T = X/V, \tag{1}$$

where V is the acoustic velocity of the propagating medium. Using water velocity of 5000 feet per second and the 230-foot group length of the prior art, the transit time for the wavelet is 0.046 second. For additive response along the length of the sensor group, the group length should be less than one-quarter wavelength. The time to travel one wavelength is therefore 0.046 × 4 or about 0.184 second. This period corresponds to a limiting frequency of about 6 Hertz. Waves incident on the end of the group having frequencies substantially greater than the 6-Hertz cutoff limit will tend to be greatly attenuated.

In the illustrative system, the length of an elemental sensor unit is 13.12 feet. The travel time for a wavelet will be 0.0026 second. The frequency corresponding to a quarter wave length will be $$f = 1/(0.0026 \times 4) = 96.1 \text{ Hertz.}$$

Thus, by use of a short sensor unit or group, the upper cutoff frequency has been substantially extended. Assuming an angle of incidence of 30° for a wide-angle shallow reflection signal received toward the end of the cable assembly, the upper cutoff frequency is raised to $$f = 96.1/\sin 30° = 192.2 \text{ Hertz.}$$

Returning now to FIG. 2a, in addition to the seismic sensors, auxiliary sensors such as a pressure transducer 64, leakage detector wires 66, 68, and water break detector 72 are mounted in cable section 20 near the leading end. Electrical connections from the auxiliary sensors join cable bundle 52 and transmit sensor output signals to appropriate pins of connecting plug 62. In a typical cable section 20, there may be ten data channels and three auxiliary channels.

FIG. 2c is a cross section of the cable section along line C—C, showing the configuration of the seismic and auxiliary sensors inside the skin 40. Part numbers in FIG. 2c correspond to like numbers in FIG. 2a. FIG. 2d is a cross section of bulkhead 44 along line D—D, FIG.

2b, showing holes 48 for stress member 42 and orifice 50 for cable bundle 52.

Two cable sections are joined as shown in FIG. 3a. In this illustration, the ends of adjacent cable sections are symmetrical, hence only one end will be described in detail. Stress members 42 and 43 protrude through terminal bulkhead 46 and are terminated by standard aircraft-type clevises 45, 47. Cable bundle 52, which extends through a central hole in terminal bulkhead 46, is terminated at connecting plug 62.

A connector module 13 is provided. Connector module 13 contains a transceiver unit, the purpose of which is to accept analog signals from seismic sensor units and auxiliary sensors, to digitize the signals, and to transmit the digital data to vessel 10 through a data link in cable bundle 52. Connector module 13 has a bulkhead connector 76 at each end to mate with connecting plug 62. The mating connecting plugs permit coupling the sensor units to the internal transceiver unit, and provide means to couple the transceivers in series with the transmission link, interrogation link, power, and test signal channels in trunk cable bundle 52. Short stress members 78, 80 (a third member not shown), terminated by aircraft-type clevises 82, 84, which are matable with clevises 45, 47, are secured to connector module 13 by steel clips 86, 88. The case 75 of connector module 13, and the bulkhead connectors 76 are designed to withstand an ambient pressure of up to 2000 psi. The outer dimensions are 2.5 × 14 inches.

When two cable sections 20, 20' are to be joined, clevises 45 and 47 of stress members 42, 43 are fastened to the mating clevises 82, 84 of short stress members 78, 80 by pins 90, 92. A connecting plug 62 is mated with bulkhead connector 76 at each end of connector module 13. A plastic boot 94, having an internal diameter slightly larger than the outer diameter of skin 40, is slipped over terminal bulkheads 46. Boot 94 is fastened to terminal bulkheads 46 by steel bands 96, 98. The interior of boot 94 may be filled with a light kerosene for buoyancy. Better floatation capability in a marine environment can be obtained by use of syntactic foam, such as is made by Dow Chemical Corp and supplied by Universal Urethanes Inc. of Houston, Tex.

Connector module 13 is shown in partial cross section in FIG. 3b. Each end of the cylindrical case 75 of connector module 13, FIG. 3b, is closed by bulkhead connector 76 that slides into a recess 100 machined into the end of cylinder 75. O-rings 102, 104 form a fluid-tight seal around the connector. Bulkhead connector 76 is held in place by snap-ring 106.

Connector module 13 is shown in cross section along line C—C in FIG. 3c, and along line D—D in FIG. 3d. The transceiver unit electronics contained within connector module 13, to be described in detail later, are mounted on three printed circuit boards 108, 110, 112, FIGS. 3c, 3d. The three boards, comprising the transceiver unit (hereinafter) generally designated as 111), are packaged in the shape of a triangular prism. They are designed to be inserted inside case 75. Prior to insertion, the interior of case 75 is lined with a thin fiberglass sheet (not shown) to insulate the electronics from the steel wall. After connector module 13 has been assembled, it is filled with mineral oil of any well known type that is harmless to the electronics components; this provides good thermal conduction and prevents water invasion.

At sea, in rough weather, towing vessel 10 (FIG. 1) is subject to unpredictable accelerations in the pitch, roll and yaw axes. To prevent such accelerations from being transmitted to seismic sensor cable assembly 12, one or more elastic cable sections 16 are connected between lead-in 17 and cable 12. The elastic cable sections are similar in construction to an active cable section except that there are no seismic or auxiliary sensors therein contained. In place of steel stress members, nylon or other elastic ropes are used. A cable bundle, equivalent to cable bundle 52 of FIG. 2a, is threaded through the center holes 50 of the bulkheads 44. Sufficient slack in cable bundle 52 is provided to permit the section to stretch up to 50% of its relaxed length. In a preferred design, two such stretch sections are used. A connector module is connected between the leading end of the first active section and the trailing end of the trailing elastic section. A second connector module 13' is attached between the trailing end of the lead-in cable 17 and the leading end of the leading stretch section.

Cable bundle 52 in each cable section 20 contains two sets of conductors. One set of local data line conductors, such as 58, 60, transmits analog signals from the sensor units 21 and the auxiliary sensors within each cable section to the transceiver unit inside connector module 13. The local conductors are preferably coaxial cables such as RG-174. The other set of cables are feed-through trunk lines for transmitting command and control signals from vessel 10 to each connector module 13 and for transmitting data signals from each transceiver unit back to vessel 10. The trunk lines include a data link, an interrogation link, two command links, two test lines, and a power transmission line. By means of the plug connections at connector module 13, the trunk lines extend the entire length of cable assembly 12.

In a preferred embodiment the wide-band data link consists of three RG-58/CU coaxial cables. Coaxial cables are required in order to accommodate the 20-Megabit per second transmission rate (40 Mhz, for a word consisting of all ONE's as described hereinbelow). Three cables are used rather than one, for redundancy. If one cable should break, two more are available for use.

The interrogation link consists of three redundant transmission lines of twisted wire pairs. Twisted pairs are permissible for this and all remaining signal transmission lines because the transmission rate of interrogation pulses is relatively low in the KHz range.

The two twisted-pair command links transmit the control signals. The test and test-control lines are twisted pairs through which are transmitted a test signal and a test control pulse.

The power transmission line consists of two twisted pairs of #14 AWG wire, connected in parallel. Through this line is transmitted AC power to energize the transceiver unit power supplies contained in each of the connector modules 13.

A block diagram of the transceiver unit 111 mounted on printed circuit boards 108, 110, 112 (FIG. 3b) of a connector module 13 is shown in FIG. 5. Principal components are repeater unit 114, interrogation network 116, command network 118, preamplifiers 120, multiplexer 122, gain conditioning amplifiers 124, analog to digital converter (digitizer) 126, output register and code converter 128, error detector 130, control network 132, power supply 134, test driver 136 and test-control relay 138. The transceiver circuit is described in detail in co-pending applications Ser. Nos. 664,617, 576,943 assigned to the same assignee. However, the functions of the transceiver unit 111 is outlined here in block form for a better understanding of the operation of this invention.

Repeater network 114 transmits a local self clocking phase-encoded data word to central station 2 (FIG. 1) via data link D1, D2, D3, and thereafter receives, regenerates and retransmits self clocking phase-encoded data words from down-link transceiver units. The above functions are initiated in response to a first interrogation pulse and are completed before the arrival of a second interrogation pulse. Upon command, or in the event of a power failure in a transceiver unit, the data receiver may be bypassed.

Interrogation network 116 receives, buffers, and retransmits interrogation pulses through interrogation link IP1, IP2, IP3. In this unit, the interrogation pulse is identified by a pulse-width identification circuit as a wide S1, reset or a narrow S2, strobe pulse. The S1 pulse is 1500 nanoseconds wide; the S2 pulse is 600 nanoseconds wide, where one nanosecond is a billionth of a second. Interrogation network 116 includes an artificial delay line in series with the interrogation link. The preferred delay is 600 nanoseconds. The artifical delay line is tapped so that small adjustments may be made to compensate for slight differences in signal propagation times through the interrogation link.

Command network 118 receives, buffers, and retransmits to down link transceivers, the two command signals DATEN (data enable) and DATA BYPASS. Simultaneous arrival of an S1 interrogation pulse and a DATA BYPASS pulse at a selected transceiver unit will cause phase-encoded words to be bypassed around the corresponding repeater network 114 through a bypass circuit (not shown). DATEN is a pulse whose width may be adjusted by multiples of the artificial delay time set into the interrogation network 116. The transceiver units in one or more selected, contiguous cable sections are activated only by the coincidental presence of DATEN and an S1 interrogation pulse.

The interrogation network 116, command network 118, and repeater network 114 are provided with power failure bypass lines actuated by relays (not shown). In event of a power failure the relays are deactivated to divert incoming phase-encoded words and interrogation and command pulses around the defective transceiver.

Analog data are transmitted from elemental sensor units 21 via local coaxial cables, such as 58, 60, through preamplifiers and filters 120 to the inputs of multiplexer 122. In response to an S1 or reset pulse, received and detected by interrogation network 116, control network 132 resets multiplexer 122 to channel #0; in response to the leading edge of an S2 or strobe pulse, the multiplexer is sequenced through a normal scan cycle to sample a desired number of the respective input channels. In the preferred device, there are 14 input channels. Channel #0 is a dummy or pseudo channel. Analog signals are handled through channels #1–10. Analog signals from auxiliary sensors are transmitted through channels #11–13.

When multiplexer 122 is reset to channel #0, certain housekeeping and test functions are performed: The gain — conditioning amplifiers are set to unity gain while DC offset is automatically removed from the multiplexer and amplifier inputs. At this time also, an error — detect circuit (to be later described) provides a warning if one or more of the three redundant data lines is defective.

As each of channels #1–13 is sampled, the analog data sample is gain-conditioned in gain-conditioning amplifiers 124. As is well known, seismic signals have a wide dynamic range of as much as 120 dB (1,000,000:1). Signal gain-conditioning includes the step of compressing the dynamic range of the seismic signals to hold the range within limits of the analog to digital converter. The gain-conditioned signal is converted by analog to digital converter 126 to a binary number which forms the sign and mantissa part of a floating point number. The gain states of the gain-conditioning amplifiers 124 are encoded as a four-bit code. The four-bit code is combined with the mantissa in output register 128 to form a floating point number of 10 to 16 bits resolution. The floating point number is representative of the amplitude level of the signal at the time of sampling. Four additional bits including a parity bit may be added to the data word as a preamble to allow proper identification of the start of phase-encoded words.

Figure 10:
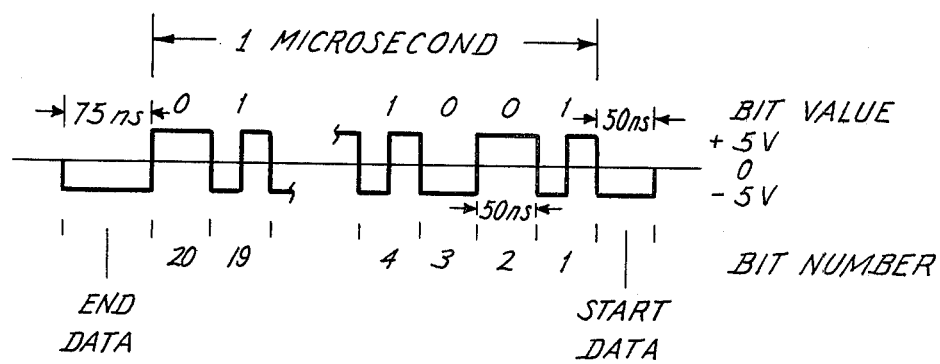
FIG. 10 is a diagram showing one type of a self clocking code for transmitting data words.

The twenty bits comprising the data word are encoded in any convenient self-clocking code and are transmitted in return-to-zero mode (RZ) over a wide band telemeter link in direct digital data transmission mode. In a preferred embodiment, a self-clocking code such as di-phase M is used. An example of a coded data word is illustrated FIG. 10. Self-clocking codes such as here used, are described on page 4–18 in "The Interface Handbook" by Kenneth M. True, Published by Fairchild Instrument Co., 464 Ellis St., Mountainview CA 94042. Circuitry implementing such codes are discussed in the same publication. The absence of data is represented by a logic level of zero. Fifty nanoseconds before the first data bit, the logic level drops to $-5V$ so that the first data bit must be a positive-going pulse. Each data bit occupies a cell time of 50 nanoseconds. A binary "1" or "one-bit" is represented by one polarity reversal at the middle of one 50-nanosecond cell time; a "zero-bit" or binary "0" is represented by no polarity reversal. Consecutive binary zeros are represented by successive 50-nanosecond polarity reversals at the cell-time boundaries. Since there are 20 data bits, a phase-encoded word occupies a time slot of 1000 nanoseconds or 1 microsecond (millionth of a second). At the end of a phase-encoded word, the logic level drops to $-5V$ for 75 nanoseconds and then goes to zero. The logic circuitry in repeater network 114 always seeks a positive-going pulse within an interval of any two cell times. When no such pulse is found, the logic senses the end of a data word.

The maximum phase change frequency of the phase-encoded words is 40 megahertz (for all ONE's). But because of the fast rise time at the leading edge of the pulses, the bandwith of the data transmission link must be at least 100 megahertz.

The inputs to multiplexer 122 are AC-coupled by capacitors 123. The multiplexer output is coupled to gain-conditioning amplifiers 124 through series resistor 140 and unity-gain buffer amplifier 142. Capacitors 123 and series resistor 140 taken in combination with multiplexer switch 122, form a preferred high-pass commutated RC filter. The cutoff frequency of the filter is $f = [1/(2\pi RC)](D/T)$ where D is the channel-on time and T is the channel-off time. This filter is described in detail in co-pending U.S. Pat. application, Ser. No. 664,614, and now U.S. Pat. No. 4,023,140 assigned to the same assignee.

The operation of the preferred gain-conditioning amplifiers 124, in combination with A/D converter 126 and output register 128 to form a floating point data word is described in co-pending U.S. Pat. application, Ser. No. 664,616 and now U.S. Pat. No. 4,031,504, assigned to the same assignee.

In a typical operating cycle, up to fourteen analog channels are sampled within one scan cycle. A new scan cycle is initiated at a desired sample rate such as once every one half or one millisecond. Thus, at a 1-millisecond sample rate, the 14 channels are sampled at 71.4-microsecond intervals. Completion of one scan cycle requires that the interrogation means in vessel 10 shall transmit one S1 or reset pulse and up to thirteen S2 or strobe pulses every millisecond.

FIG. 11 illustrates the timing of the S1 and S2 pulses within a one-millisecond scan cycle. As an S1 interrogation pulse propagates along interrogation link 12 to the respective transceiver units the corresponding multiplexers are reset to channel #0. In turn, a data word is clocked by controller 132, from output register and code converter 128, through the repeater network 114 into the data link. The phase-encoded words are time-delay multiplexed into the data link by reason of the inherent delay time of the interrogation pulse between adjacent transceiver units and the artificial delay time set into the interrogation network. After 71.4 microseconds, the first S2 pulse is transmitted. The multiplexers in the respective transceiver units are successively advanced to channel #1 as the S2 pulse reaches each transceiver unit, and phase-encoded words are again clocked into the data link from each transceiver unit in sequence. Additional S2 pulses are transmitted until all of the desired channels in the transceiver units have been sampled (refer to application Ser. No. 446,862) and now U.S. Pat. No. 3,990,036.

The above described sequence is illustrated in the timing diagram of FIG. 12. Interrogation (IP) pulses flow outward from right to left (the time base increases to the right), from the central station 2 to transceiver units in the 50 connector modules 13A, 13B, 13C, etc., each of the connector modules 13 being respectively down-link from the central station. In the upper three plots of FIG. 12, therefore, time increases from left to right. An S2 pulse for example arrives at connector module 13A, to advance the multiplexer to channel #1. After passing through the artificial delay line, the S2 pulse leaves connector module 13A 600 nanoseconds later. The distance between the transceiver unit in connector module 13A and the transceiver unit in connector module 13B is 196.8 feet. Assuming a propagation velocity of 1.305 nanoseconds per foot in the twisted-pair interrogation link, the S2 pulse will arrive at connector module 13B, 256.8 nanoseconds later. The total delay between A and B is therefore 856.8 nanoseconds.

As soon as the leading edge of the S2 pulse for channel #1 is recognized by the transceiver unit in connector module 13A a phase encoded word is clocked out to the data link. The data flow is from left to right (the time base increases to the left), up-link towards the central station. When the S2 pulse arrives at connector module 13B, 856.8 nanoseconds later, the data word for connector module 13B is clocked out. The signal propagation velocity in the coaxial cable forming the data link is 1.542 nanoseconds per foot. Therefore, the leading edge of the phase-encoded word from connector module 13B will arrive at the repeater network 114 in connector module 13A, 1160.3 nanoseconds after the leading edge of the phase-encoded word from connector module 13A left repeater network 114. A phase-encoded word separation of 160.3 nanoseconds is therefore provided.

A two-level, delay-time sequential/channel-sequential multiplexing system has been disclosed. The phase-encoded word transmitted from successive ones of the fifty transceiver units in the connector modules are ordered in accordance with the propagation delay time of the interrogation pulse between the central station and the respective transceiver units. Phase-encoded words from the fourteen channels within each of the respective transceiver units are ordered in accordance with the channel-select sequence during a scan cycle.

The DATEN input to command network 118 in FIG. 5 enables the operation of the system as outlined above. The timing of the application of a DATEN pulse permits either all of the sections of seismic cable assembly to be employed, or only some portion thereof, such as the forward half of the cable sections. As mentioned above, it may be desirable to sample the elemental seismic units in the proximate half of the cable at one sampling rate immediately following generation of seismic impulses and subsequently to sample signals from the entire cable at a different rate. The use of DATEN pulses of suitable length and timing may be employed to accomplish these functions. In the following description the necessary timing and length of the DATEN pulses will be described on a general basis so that any number of the transceiver units may be selectively enabled.

Before considering the timing diagrams in detail, it is useful to review the overall data-acquisition scheme, and the time frame in which the data originating with each of the 500 elemental data units is transmitted from the cable. First, it should be noted that each of the 50 cable sections has 10 elemental sensor units along its length and an associated transceiver unit which processes the data from these 10 sensor units. Upon command from the shipboard control unit 4 in central station 2 of FIG. 1 by the transmission of a wide S1 pulse, phase-encoded words from the last channel of each of the 50 cable sections are sent from the cable in sequence, over a single data link (made up of three redundant coaxial cables). Subsequently, upon receipt of a narrow S2 pulse, the transceiver associated with each of the 50 cable sections will transmit channel #0 information from each cable section in sequence; then, following receipt of another S2 pulse, channel #1 information is sent from each of the 50 cable sections, etc.

Concerning timing, each cycle of sampling the signal present at all 500 channels occurs during one millisecond or one one-thousandth of a second. This cycle is defined as a scan cycle and is the time between successive S1 pulses. Transmission of an individual binary bit of a phase-encoded word only occupies 50 nanoseconds, or billionths of a second. With each phase-encoded word being represented by twenty bits, each phase-encoded word is transmitted in about 1,000 nanoseconds or 1 microsecond (millionth of a second). Of course there are 1,000 microseconds in each 1-millisecond sampling interval, so there is ample time to transmit data samples from the 500 seismic channels through the cable during each sampling interval in a systematic manner as described below.

Activation of one or more transceiver units, requires the simultaneous presence of an S1 pulse and a DATEN (data enable) pulse. For example, refer to FIG. 13. A plurality of cable sections are disposed remotely with respect to a central station. At the leading ends of each section are located connector modules 13A-G, each containing a seperate transceiver unit. Assume, for example that it is desired to enable only the three consecutive transceiver units in connector modules 13A-E and no others. An apparatus for performing this function is disclosed in application Ser. No. 665,151, and now U.S. Pat. No. 4,023,140, assigned to the same assignee, but is briefly described here for a better understanding of this invention.

An S1 pulse is transmitted from central station 2 through the interrogation link to each connector module 13 in sequence. The instant of arrival of S1 at 13A is $t = 0$, the arrival time at 13B will be $t = 856.8$ nanoseconds, the S1 arrival time at 13C will be $t = 1713.6$ nanoseconds, etc. The six timing lines in FIG. 13 labeled IPA-IPF represent the locations of the same S1 pulse with respect to connector modules 13A-F each containing separate transceivers, at the end of each 856.8-nanosecond interrogation pulse travel-time interval. Some time after an S1 pulse is transmitted, A DATEN pulse is transmitted through the command link. The signal propagation velocities in the twisted pairs comprising the interrogation and command links are the same. However because of the 600-nanosecond delay line in each transceiver unit that is included in interrogation network 116, the effective S1 pulse velocity is slower than the command pulse velocity because there are no equivalent delay lines in the command link. Accordingly a DATEN pulse, delayed 1200 nanoseconds with respect to a corresponding IP pulse, will intercept the S1 pulse at the third transceiver unit in connector module 13C. The six timing lines labeled DATEN-A-F show the position of a DATEN pulse with respect to the S1 pulse at the end of each 856.8-nanosecond interrogation pulse travel time interval. Referring again to FIG. 13, when an S1 pulse arrives at the transceiver unit in connector module 13A, no action will occur at 13A because the DATEN pulse is lagging 1200 nanoseconds behind. At the transceiver unit in connector module 13B, the DATEN pulse is 600 nanoseconds behind so no action will take place at 13B. The DATEN pulse intercepts the S1 pulse at the transceiver unit in connector module 13C, so the transceiver unit in connector module 13C is activated. At 13D, the leading end of the DATEN pulse is ahead of the S1 pulse by 600 nanoseconds, but because of the width of the DATEN pulse, it is still available to activate the transceiver unit in connector module 13D. At 13E, although the leading edge of DATEN is 1200 nanoseconds in advance of S1, its trailing edge has not yet passed the IP pulse; hence the transceiver unit in connector module 13E is activated. Finally, by the time the IP pulse arrives at the unit in connector module 13F, the trailing edge of the DATEN pulse is well ahead of the S1 pulse. Therefore, the transceiver unit in connector module 13F and all subsequent transceiver units will not be activated. All transceiver units that are activated by coincident S1 and DATEN pulses, will remain active for one entire scan cycle. That is they will be responsive to all incoming S2 pulses.

Figure 13:
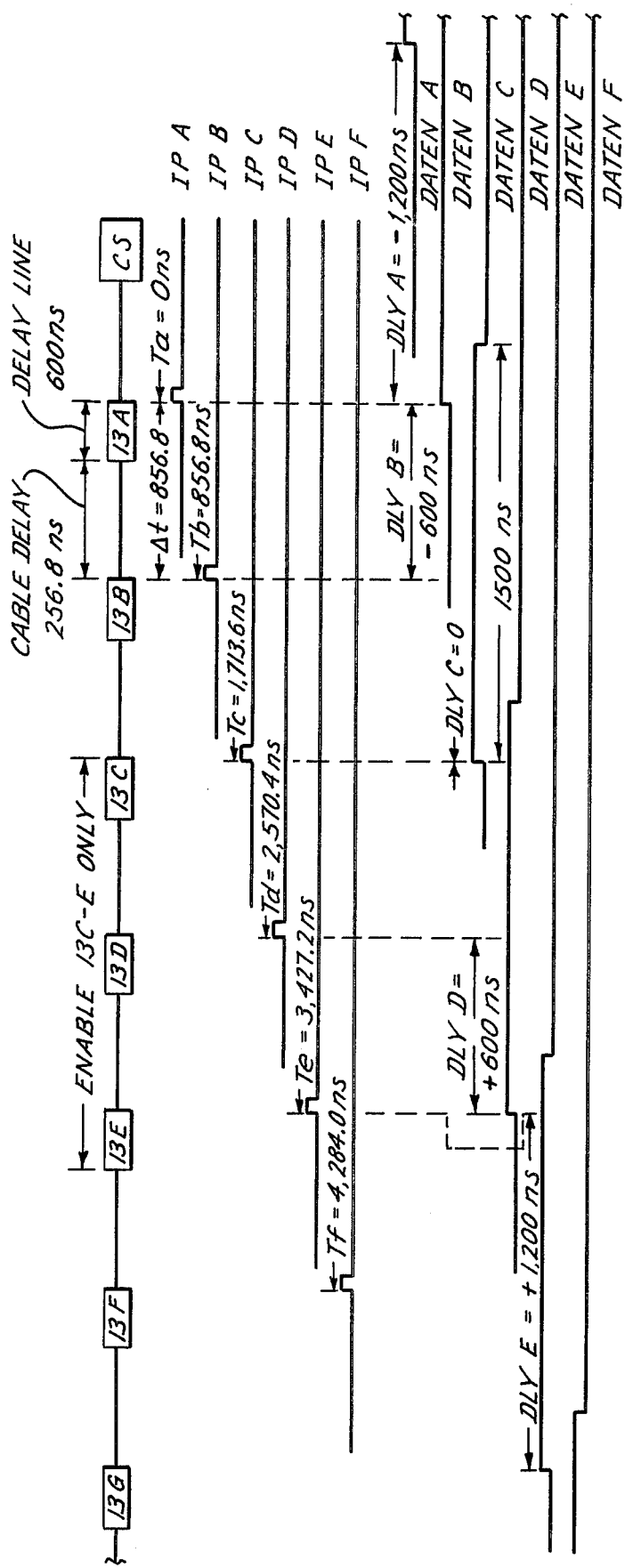
FIG. 13 is a timing diagram to show the method for activiating three consecutive transceiver units but no others.

The width W of a DATEN pulse is equal to $$W = [(L-1) \times DLY] + dt$$

where
L = number of transceiver units to be activated,
DLY = artificial delay line time,
dt = a small time increment of arbitrary length to allow for slight propagation time differences. In the example of FIG. 13, the width of the DATEN pulse is $$[(3-1) \times 600] + 300 = 1500 \text{ nanoseconds}.$$

The initial delay time ID, to be applied to the DATEN pulse is
$$ID = M \times DLY,$$

where M is the number of transceiver units to be skipped between the central control unit and the first active transceiver unit.

As discussed earlier, a DATA BYPASS pulse coincident with an S1 pulse is used to bypass data around a defective transceiver unit. The delay BD to be applied to the DATA BYPASS pulse relative to an associated S1 pulse is $$BD = K \times DLY,$$

where K is the number of transceiver units intervening between the central station and the defective transceiver unit.

Returning now to FIG. 5, the data and interrogation links forming a part of cable bundle 52 consist of three lines in parallel. In case one of the lines is broken, the other two remain available. Any two good lines are selected by majority vote. A majority vote circuit is coupled to the input lines of repeater network 114 and interrogation network 118. The circuit, generally shown as 131 in FIG. 5, and shown in detail in FIG. 6, consists of AND-gates 136, 138, 140 and OR-gate 142. A logic-1 present simultaneously on any two of the three data lines will produce a logic-1 at the output of OR-gate 142.

Error detect circuit 130 is coupled to the majority vote circuit in repeater network 114 and provides a signal in the event that one of data lines D1-3 becomes broken. The circuit (FIG. 6) consists of NAND-gate 144, diode 146, storage capacitor 148 and bias resistor 150. A negative voltage is applied to error detect line 152 to hold it slightly negative when there is no output from gate 144. If any one of lines D1-3 becomes disabled, the output of NAND-gate 144 opens. During a normal scan cycle, phase-encoded signals flow at a 40 Mhz rate, through the majority-vote circuit and to NAND-gate 144 connected to the inputs of repeater network 114. So long as all three lines are good, there will be no output from NAND-gate 144. If, however, one line is defective, a 40 MHz signal will be present at the output of NAND-gate 144. The signal is rectified by diode 146. The resulting rectified voltage becomes stored in capacitor 148, creating a positive error voltage on error detect line 152. During the period that multiplexer 122 is reset to channel #0, switch arm 154 (located between gain conditioner 124 and A/D converter 126, FIG. 5) is moved from contact 156 to contact 160, permitting A/D converter 126 to sample the voltage level existing on error-detect line 152. A mechanical switch is shown in the drawing for simplicity, but it should be understood that a high-speed Schottky FET switch is used in practice.

Marine streamer cables of the type described tend to stretch as much as 1% when under tow. For a 10,000-foot cable, the total stretch will be on the order of 100 feet. The seismic sensor units are spaced on 19.68-foot (6 meter) group centers within each cable section. With a 100-foot stretch, the sensor units in the leading end of cable assembly 12 will be displaced nearly 5 group intervals with respect to the sensor units in the trailing end of the cable assembly. In synthesizing a larger array from a number of elemental sensor units, it is necessary to know the exact sensor unit spacing. If the spacing is not known accurately, the effectiveness of the synthesized array is greatly diminished. The relation between cable stretch and towing tension is known. Accordingly a strain gauge 11 (FIG. 1) of any well-known type is connected to the stress members between the trailing elastic section 16 and the first active cable section 20. Output from strain gauge 11 is fed to the input of an auxiliary channel, located in the transceiver unit in connector module 13' at the leading end of the first elastic section. From knowledge of the towing tension, errors in sensor-unit spacing that are due to cable stretch can be corrected.

As is well known in the seismic art, individual hydrophones seldom have identical sensitivities. A variation of ±25% is not uncommon. Accordingly, a means is provided to calibrate the hydrophones. When it is desired to calibrate the hydrophones an analog test signal having a known amplitude is transmitted to test driver 136 through the test-signal line 162 (FIG. 5). A preferred test-signal frequency is 15.625 Hz. A test-control signal is transmitted over test control line 163 to test-control relay 138 which moves a switch contact arm 164 from contact 165 to contact 166. A test signal is now applied to drive the elemental sensor units 21 through resistor 168. A normal multiplexer scan cycle is initiated to transmit the output from each sensor unit 21 to the central station 2 in vessel 10. The amplitude of the output signal for each sensor unit is compared with the test-signal amplitude to provide a calibration factor for each sensor unit. Calibration of the sensor units is done at any time that seismic data is not being recorded.

The test signal is used to make an accurate measure of the sensitivities of all of the sensor units in the entire seismic sensor cable assembly 12 which may be as much as two miles long. Over such a distance, due to the IR drop, the test signal at the trailing end of the cable would become severely attenuated if the test-signal drivers 136 were connected in parallel across the test-signal line. Accordingly a resistor 167 is connected in series with the test signal line 162 in each transceiver unit. The inputs of the test signal driver are connected across the series resistor 167. Since all resistors have the same value, all of the test-signal drivers will see identical input voltages. In this way, a constant-amplitude test signal is guaranteed for each transceiver unit.

A power supply 134 is provided. Power is transmitted from vessel 10 to the connector module 13 through a pair of twisted wires 170, 172. Each power supply includes a current transformer and shunt regulator. The transformer primaries in the respective transceiver units in connector modules 13 are connected in series. By transposing wires 170, 172 in each cable section 20, every alternate transformer is connected to an opposite side of the power line to maintain a balance of the line loading (FIG. 4). Since the power supplies are series-connected, the voltage drop along cable assembly 12 between vessel 10 and terminator section 18, will depend on the number of connector modules 13 that are connected together. For a 50-section cable assembly, the voltage drop will be on the order of 400-500 volts. Power is transmitted at 2000 Hz, 4A. This frequency is substantially above normal seismic frequencies and hence does not interfere therewith. In power supply 134, AC power from the power line is rectified and converted to ±15V and +5V for use by the logic circuits in the transceiver units. In the event of a fault such as an open circuit in a transceiver unit the voltage across the primary of the power transformer would rise to a very high level. A protective Triac crow-bar circuit of any well-known type shorts the primary if the voltage increases above a predetermined limit. Upon shutdown of the power supply, the fail-safe bypass relays (not shown) in repeater network 114, interrogation network 116 and command network 118 are released by default, thereby allowing command pulses and phase-encoded data words to by-pass the defective module.

As previously described, multiplexer 122 is provided with 14 inputs, of which channels #11-13 are used for transmission of data from the auxiliary sensors next to be described.

Figure 7A:
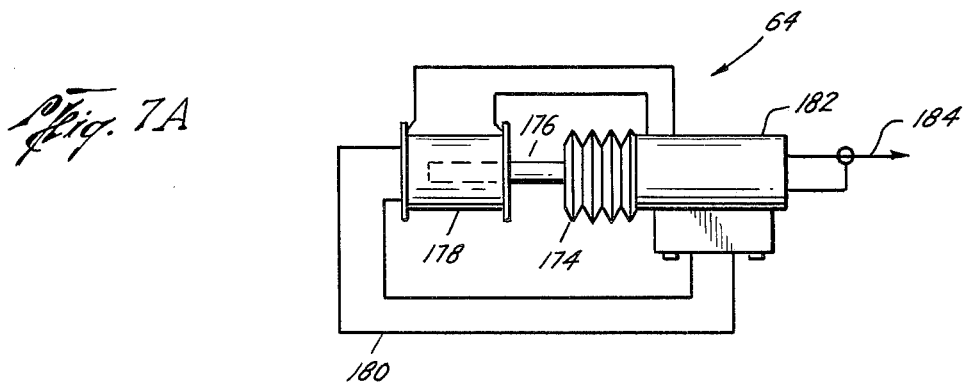
FIG. 7a is a view of a pressure transducer.

Pressure transducer 64, first discussed in connection with FIG. 2a and now described in detail, is of a type well known to the seismic art. For reference, its function will be described briefly. Illustrated in FIG. 7a, the transducer includes a sylphon bellows 174. Attached to the movable end of bellows 174 is a soft iron pole piece 176. Pole piece 176 moves longitudinally within a longitudinal hole in coil 178 which is attached to the fixed end of bellows 174 by a support bracket 180. An oscillator, including an LC tank circuit, is contained within housing 182. Coil 178 is the inductive portion of the tank circuit. In a fluid medium, a change in pressure against sylphon bellows 174 causes pole piece 176 to move within coil 178, thereby changing the inductance and hence the frequency of the oscillator. The output signal of pressure transducer 64 is therefore an FM (frequency modulated) signal whose frequency is related to the ambient fluid pressure. The FM signal is transmitted over a coaxial cable to channel #11 of multiplexer 122 (FIG. 7b).

Figure 7B:
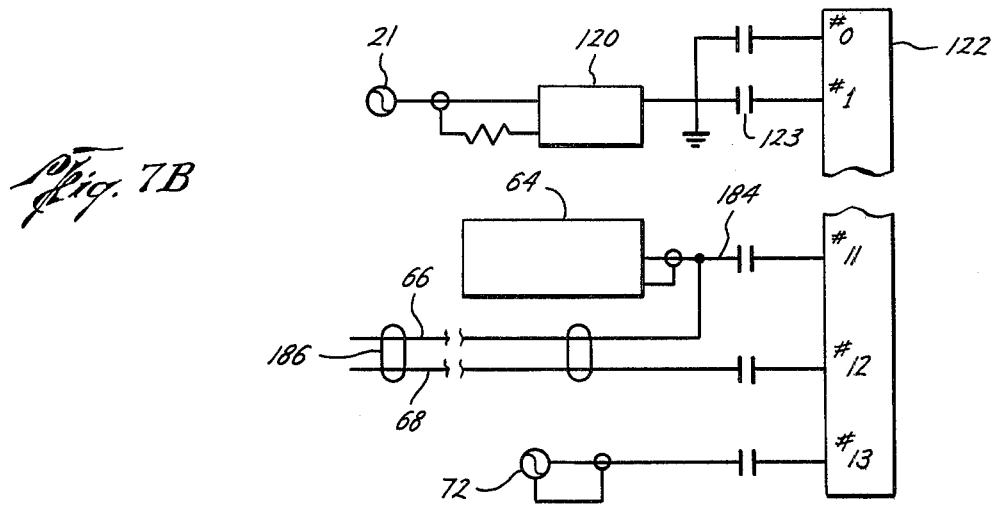
FIG. 7b shows the electrical connections of the auxiliary channels.

Referring to FIG. 7b, a leakage detector 186 is provided to detect the presence of salt water inside skin 40 of a cable section 20. The leakage detector 186 consists of two wires 66, 68, imperfectly insulated by a porous plastic. The porous covering prevents physical contact between the wires but permits water to make a fluid contact. The two wires 66, 68 extend the length of cable section 20. One wire 66 is connected to the oscillator output 184 of the pressure transducer 64. The other wire 68 is connected to auxiliary input channel #12 of multiplexer 122. So long as no water is present inside cable section 20, there will be no signal on the leakage-detect channel. If water should invade the cable section, a conductive path is established between the two wires 66 and 68. An amplitude-modulated FM signal will then appear on the leakage-detect auxiliary channel. The amplitude of the signal will be proportional to the resistance of the leakage path.

A water break detector 72 is connected to auxiliary input channel #13. Water break detector 72 is a special hydrophone used to sense an acoustic wave arriving directly from the sound source along a travel path near the water surface.

In this invention, although all of the active cable sections are identical and interchangeable, it is necessary to provide an impedance matching termination to terminate the data, command, and interrogation signal lines at the last section to prevent undesired reflections. Furthermore, the series-connected power, test, and test-control conductor pairs must be provided with a return circuit. Accordingly, a terminator section 18, is connected to the trailing end of the last cable section 20. The construction of the terminator section is shown in FIG. 8a.

Figure 8A:
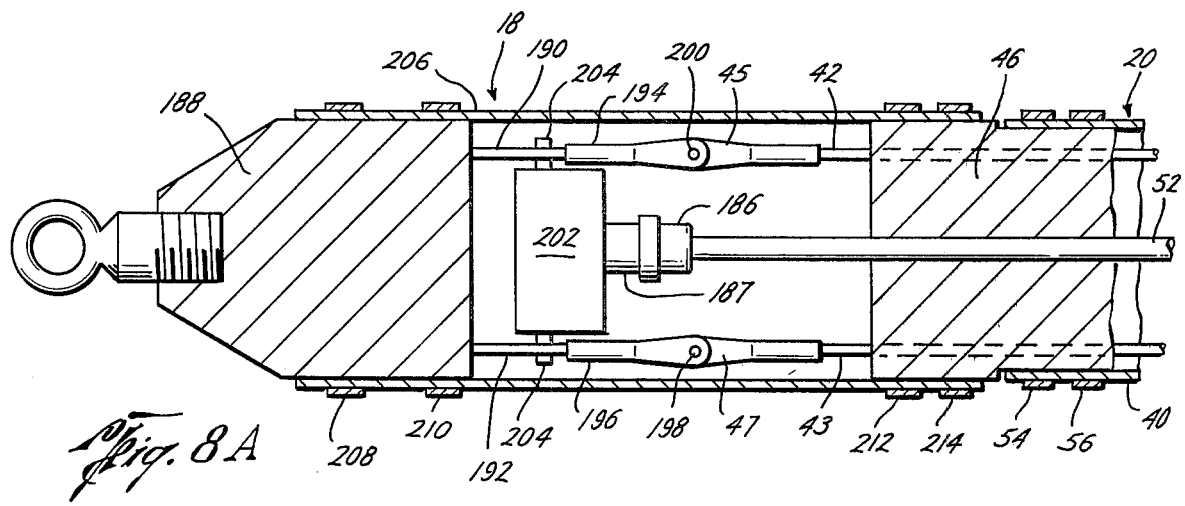
FIG. 8a is a cross-sectional view of the terminator section.

In FIG. 8a, the terminal bulkhead 46 of the last cable section 20, is shown. Skin 40 is secured to the bulkhead by steel bands 54, 56. Cable bundle 52 and plug 186 extend beyond terminal bulkhead 46, along with stress numbers 42, 43 and clevises 45, 47. A tail-swivel plug 188 is provided. One end of three short stress members 190, 192, (the third not shown) are embedded in the body of the plug. Clevises 194, 196 matable with clevises 45, 47 are secured thereto by pins 198, 200.

Terminator module 202 is secured to stress members 190, 192, by a steel band 204. The leads contained in cable bundle 52 are electrically connected to terminator module 202 by plug 186 and mating plug 187. A plastic boot 206 is slipped over plug 188 and terminal bulkhead 46 of the last active section 20. The boot is secured in place by steel bands 208, 210, 212, 214. The volume inside boot 206 is filled with light kerosene to provide floatation.

Figure 8B:
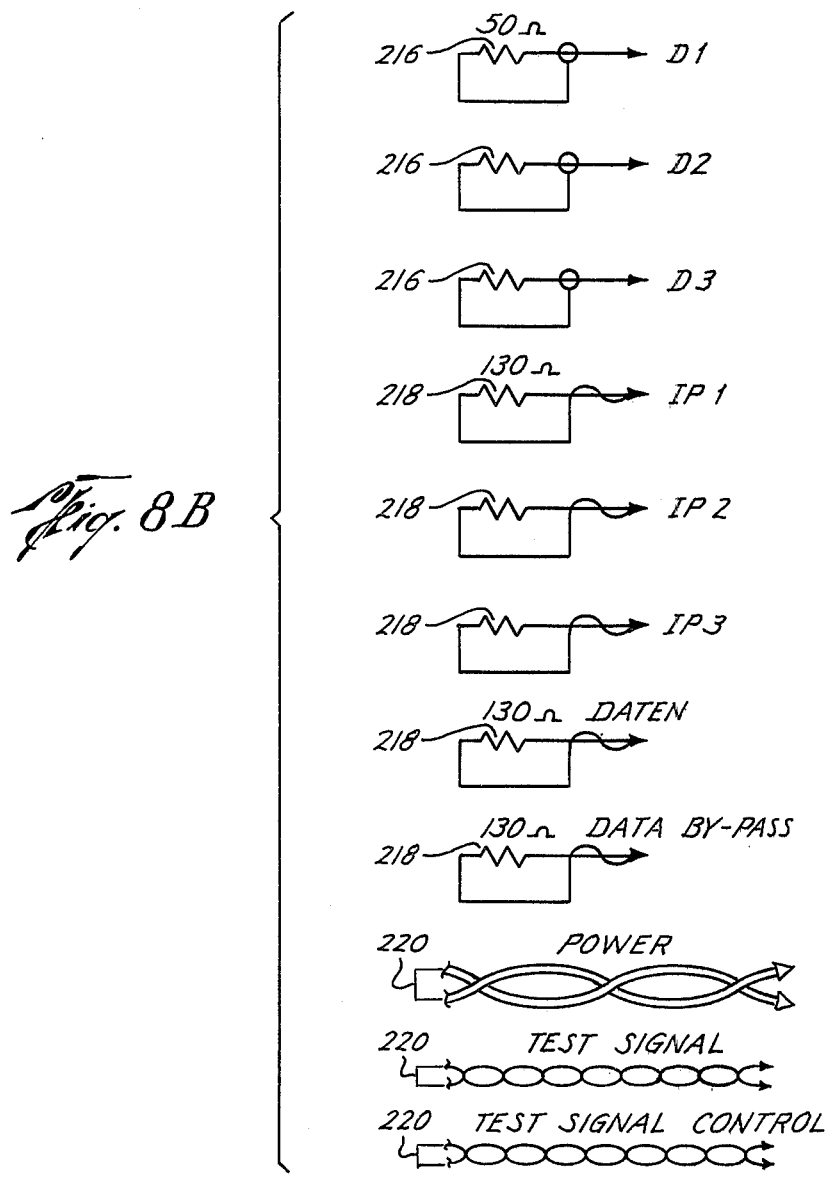
FIG. 8b is a schematic showing the electrical connections in the terminator section.

The electrical connections inside terminator module 202 are shown in FIG. 8b. Coaxial data lines D1-3 are terminated by 50 ohm, ¼ watt resistors 216. The twisted pairs for command lines IP1, IP2, IP3, DATEN and DATA BYPASS are terminated with 130 ohm, ¼ watt resistors 218. Power, test signal and test control lines are shorted by bridge wires 220.

Figure 9:
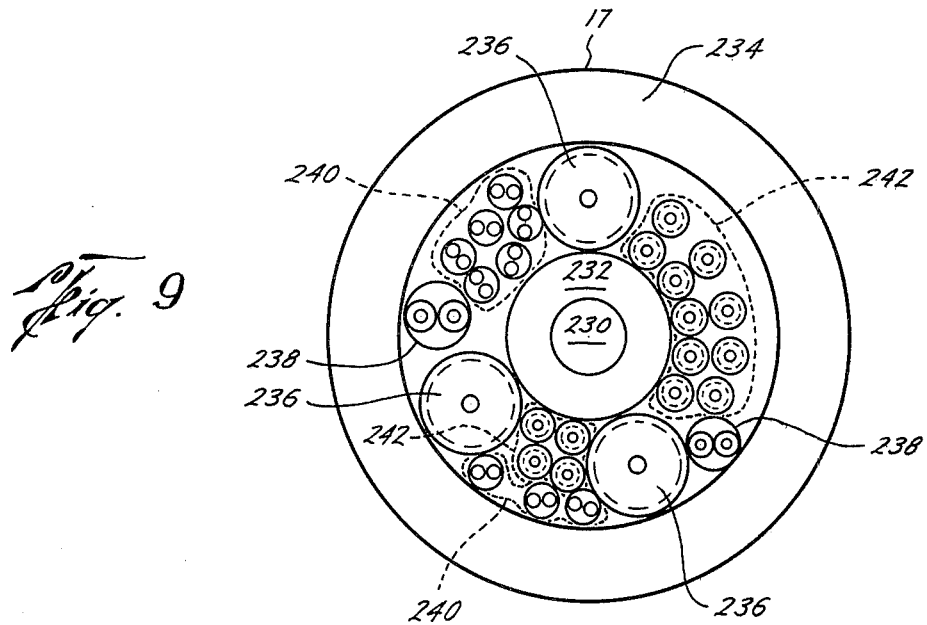
FIG. 9 is a cross sectional view of the lead-in cable.

A lead-in cable 17 is coupled to the leading end of elastic section 16 by a transceiver unit in connector module 13'; the free end the lead-in cable 17 is secured to vessel 10, thereby providing means to tow cable assembly 12 as well as to provide connection to the central station. The lead-in cable 17 is shown in cross-section in FIG. 9. It consists of a central stress member 230, preferably inch, non-rotating steel cable. Stress member 230 is jacketed with neoprene or other plastic 232. The conductors that made up the cable bundle 52 in the active cable section are spirally wrapped around jacketed stress member 230. The conductors are themselves encased in a suitable plastic jacket 234. The lines are identified in FIG. 9 as coaxial data lines 236, double-twisted-pair power lines 238, twisted pair command lines grouped generally as 240, and coaxial local data lines generally shown as 242. Because lead-in 17 may be up to 600 feet long, the data lines 236 are RG/59U coaxial cables to prevent signal degradation. The local data lines 242 extend from vessel 10 to connector module 13' where they are connected to the inputs thereof. The local data lines 242 may be used to introduce to the system, signals from special sensors 222 (FIG. 1) close to vessel 10.

The cable assembly disclosed has been described in terms of a marine application wherein the towing vehicle is a vessel. It is, however, readily adaptable to land use by means of modifications obvious to those skilled in the seismic art. For example, sensors for measurement of parameters such as ambient water pressure, water leakage, and direct water breaks are not needed. The buoyant marine streamertype cable would be replaced by a conventional land cable. Hydrophones would be replaced by geophones, etc. Various types of sound sources may be employed such as but not limited thereto, explosives, swept-frequency vibrators, gas guns, air guns, earth-impacting tools and the like.

We claim as our invention:

1. A two-stage multiplexing seismic exploration and telemetry system comprising:

a seismic cable including a broadband transmission link;

a plurality of transceiver units spaced along said cable;

a plurality of seismic sensor units having outputs into each of said transceiver units;

remote control means for multiplexing signals from desired ones of said transceiver unit onto said broadband transmission link; and remote control means for successively connecting selected seismic sensor units to the associated transceiver unit, whereby the output representative of the amplitude and polarity of the signal from each selected seismic sensor unit is sampled and applied to said transmission link.

2. A seismic cable assembly for connection to a central station comprising:

a plurality of cable sections disposed in tandem remotely from said central station, each said cable section including at least one wide band transmission link for transmitting multiplexed date signals to said central station, and a plurality of elemental sensor units;

a plurality of connector modules, each said module including a transceiver unit, a plurality of analog channels connected respectively to said elemental sensor units, common signal conditioning electronics means for sampling and digitizing seismic signals from said analog channels as corresponding multibit digital data signals representative of the amplitude and polarity of the seismic signals at the time of sampling, means for multiplexing said digital data signals and means for applying said digital signals onto said wide band digital transmission link to said central station, means for receiving, regenerating, and retransmitting seismic data from more remote cable sections over said wide band transmission link to said central station, each said module being identical and interchangeable without adjustment; and means for timing the application of said digital signals to said wide band transmission link, said timing means including at least one interrogation channel for transmitting interrogation signals at timed intervals to said cable sections, and means included in each said connector module for receiving and retransmitting said interrogation signals to cable sections more remote from the central station; and said cable assembly further including sensor test and testcontrol channel means and means for supplying AC power through said cable sections to said modules at a frequency at least double the frequency at which each analog channel is sampled.

3. A cable assembly as defined in claim 2 wherein said transceiver units include channel-select means for sequentially connecting a desired number of analog channels to said common signal conditioning means in response to a series of said interrogation signals.

4. The cable assembly of claim 2 wherein:

means are provided for ordering the seismic data signals transmitted from a selected number of transceiver units in accordance with the propagation delay time of interogation pulses through said interrogation channel; and additional means are provided for ordering the seismic data signals from a desired number of analog channels in the selected transceiver units in accordance with a desired channel select sequence.

5. The cable assembly of claim 2 wherein:
said interrogation channel in each cable section includes triple redundant conductor pairs and said active electronics means includes means for accepting pulses from any two of said conductor pairs.

6. The cable assembly defined by claim 2 wherein:
said wide band transmission link in each section includes triple redundant coaxial lines and said transceiver unit includes means for accepting data signals from any two of said lines, means for detecting a broken line, and means for transmitting an error-detect signal through said wide band transmission link when a broken line is detected.

7. The cable assembly of claim 2 wherein said assembly is a marine streamer cable including means for imparting substantially neutral bouyancy to said cable;
at least one auxiliary analog channel, said auxiliary channel being coupled to means for measuring water depth, said means having a constant amplitude frequency-modulated output signal indicative of the water depth; and
a water leakage detector means in each cable section comprising two imperfectly insulated wires extending the length of said cable section for modulating the amplitude of the frequency-modulated signal of said pressure transducer when water is present in said cable section.

8. The marine cable assembly of claim 7 and including:
means, attached to said cable assembly, for measuring the stretch of said cable assembly.

9. The cable assembly of claim 2 and including impedance-matching termination means for terminating said wide band transmission means, and said interrogation means, and means for providing a return circuit for said power sensor, test, and test-control means, said termination means being coupled to the end of the cable section most remote from the central station.

10. A cable assembly as defined in claim 1 wherein said timing means includes at least one interrogation channel for transmitting interrogation signals at timed intervals to said connector modules and means are provided within each connector module to transmit digital data from each said plurality of analog channels to said central station in response to a number, less than the number of said connector modules within said assembly, of interrogation signals transmitted by said central station.

11. A two-level seismic data multiplexer and telemetry system comprising:
a seismic cable including a broad-band transmission link;
a plurality of transceiver units spaced along said cable;
a plurality of seismic sensor units associated with each of said transceiver units;
means for activating a preselected sub-plurality of transceivers;
switching means included in each said activated transceiver unit for selecting one of said seismic sensor units and coupling it to the associated transceiver unit;
means for sampling and applying seismic signals representing data from the selected sensor unit, from each said activated transceiver unit in succession onto said broad-band transmission link; and
control means for actuating each said switching means to select and couple another seismic sensor unit to each activated transceiver unit following the sampling of the first sensor unit; so that a first set of seismic signals from all of said activated transceiver units is first applied to said transmission link, then a second set of seismic signals from said activated transceiver units is applied to said link, and so forth until a desired number of said seismic sensor units in said activated transceiver units have been sampled.

12. In a seismic data acquisition system including a plurality of transceivers, each having a plurality of input channels and an output channel, means for applying seismic signals to each said input channel, a multiplexer for sequentially coupling the input channels of each transceiver to the output channel, a signal transmission link coupled to the respective transceiver output channels for receiving seismic signals therefrom, a central station coupled to said signal transmission link for receiving the storing signals from said transmission link and interrogation and command links interconnecting said central station with said transceivers, a data multiplexing method comprising the steps of:
activating a first desired sub-plurality of transceivers;
initiating a scan cycle by resetting said multiplexer;
advancing said multiplexer during the scan cycle, sampling the signals present in successive ones of the input channels; and
interrupting the scan cycle by resetting the multiplexer when the signals in a preselected number of input channels have been sampled.

13. The method as defined by claim 12 including the steps of:
a. establishing a data recording cycle by generating a seismic disturbance;
b. initiating a first plurality of scan cycles;
c. interrupting each of said first plurality of scan cycles after the signals present in a first preselected number of input channels have been sampled; and
d. initiating a second plurality of scan cycles and interrupting each of said second plurality of scan cycles after the signals present in a second plurality of input channels have been sampled.

14. The method as defined in claim 13 including the further steps of:
activating a second desired sub-plurality of transceivers;
establishing another recording cycle; and
repeating steps b. through d.

15. The method as defined by claim 14 including the steps of:
transmitting a set of control pulses over said command link from said central station and activating a desired subplurality of transceivers;
transmitting a reset pulse over said interrogation link from said central station to the activated transceivers and initiating a scan cycle;
transmitting a series of strobe pulses from said central station to said activated transceivers, over said interrogation link, during the scan cycle, advancing the multiplexer to another input channel each time a strobe pulse is received; and
transmitting another reset pulse, interrupting the previous scan cycle, and initiating a new scan cycle.

* * * * *